Sept. 14, 1954　　　J. A. PIERCE ET AL　　　2,689,346
LONG RANGE NAVIGATION SYSTEM
Filed June 13, 1945　　　　　　　　　　　　6 Sheets-Sheet 1
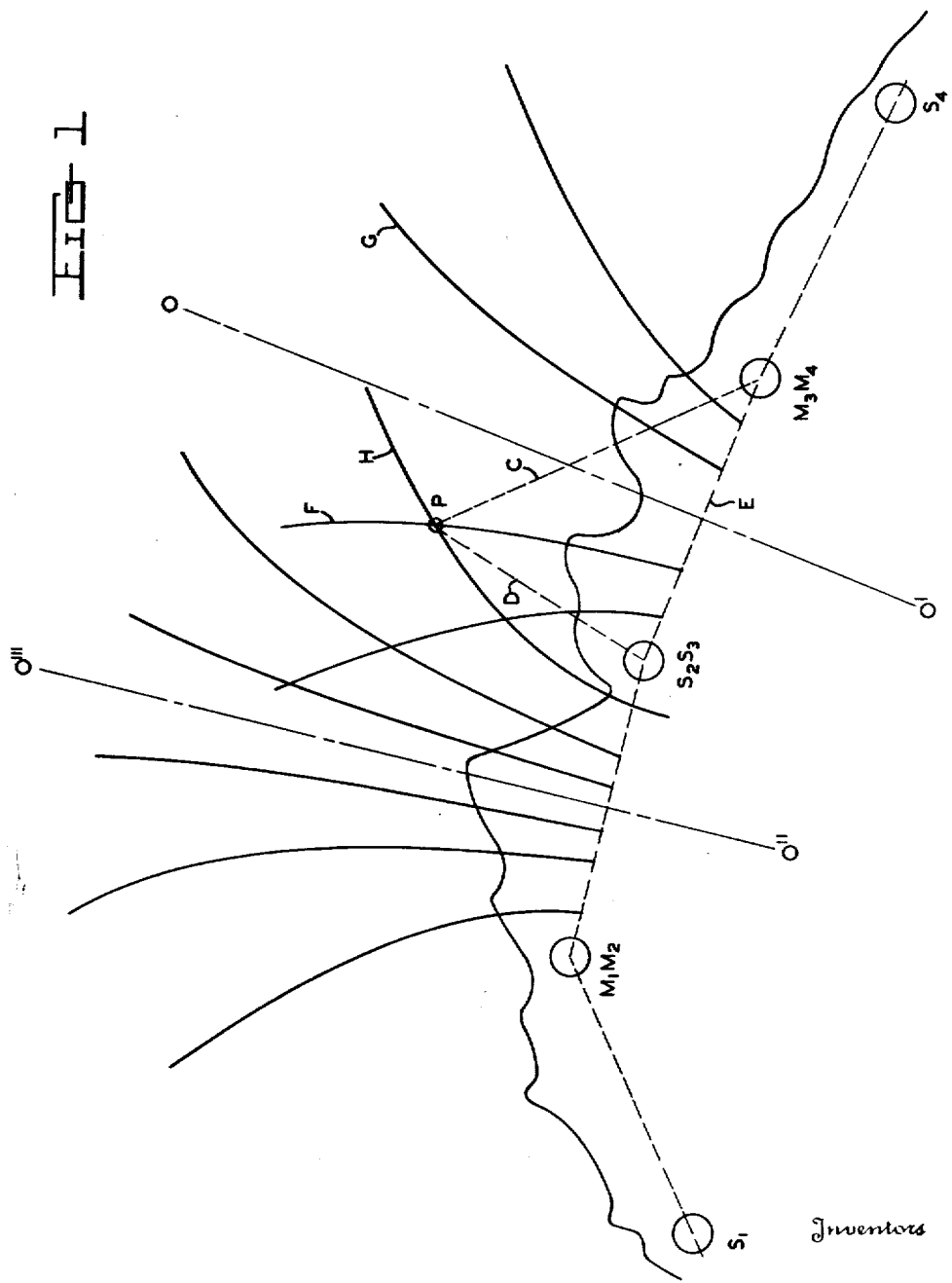
Inventors
JOHN A. PIERCE
DONALD E. KERR
JABEZ C. STREET
By Ralph L. Chappell
Attorney

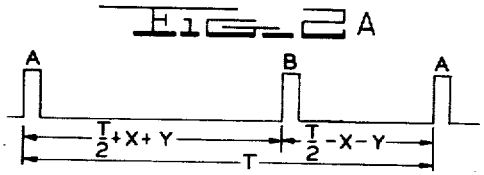
FIG. 2A
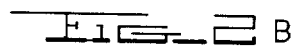
FIG. 2B
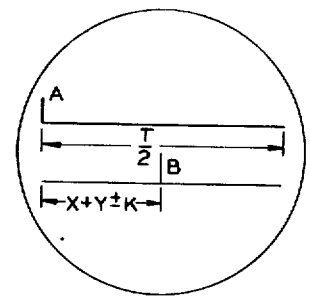
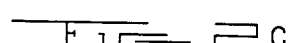
FIG. 2C
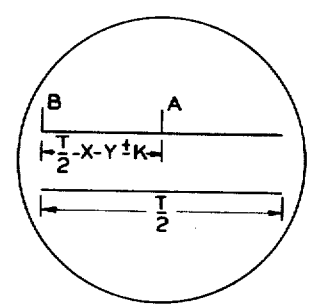
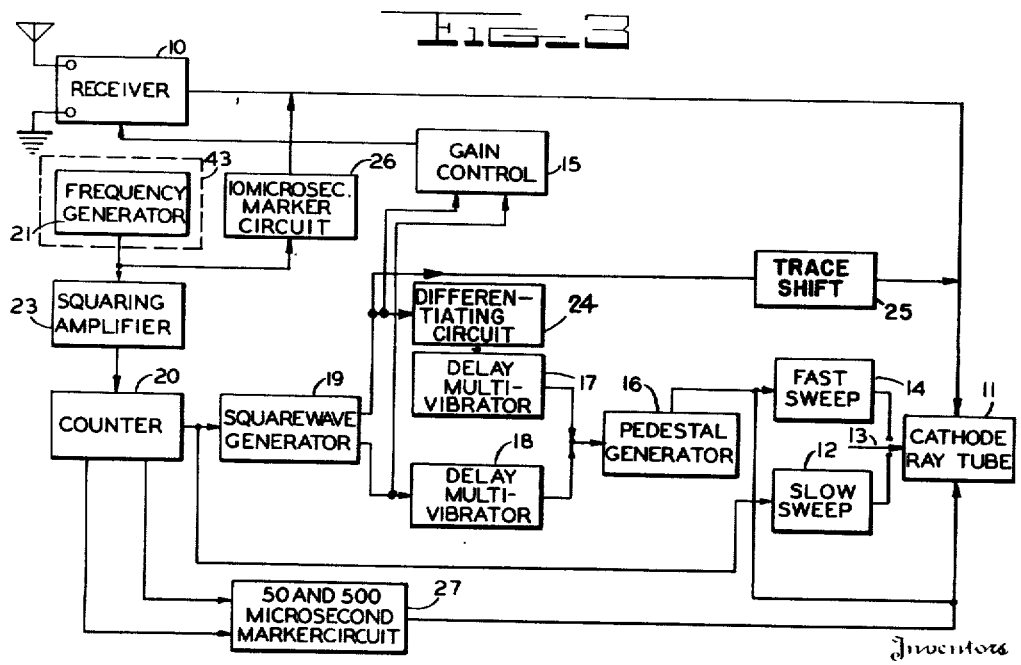
FIG. 3
Inventors
JOHN A. PIERCE
DONALD E. KERR
JABEZ C. STREET

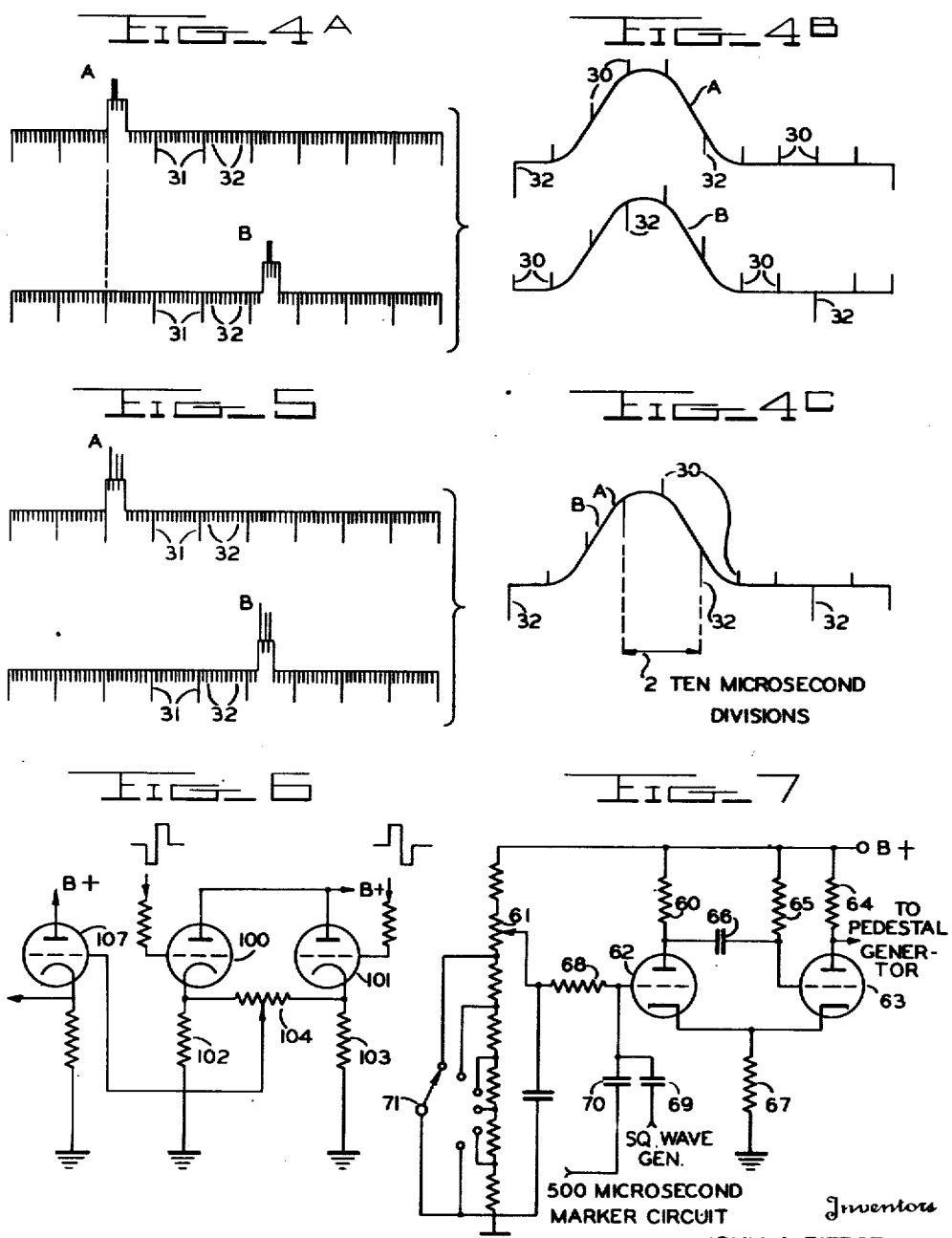

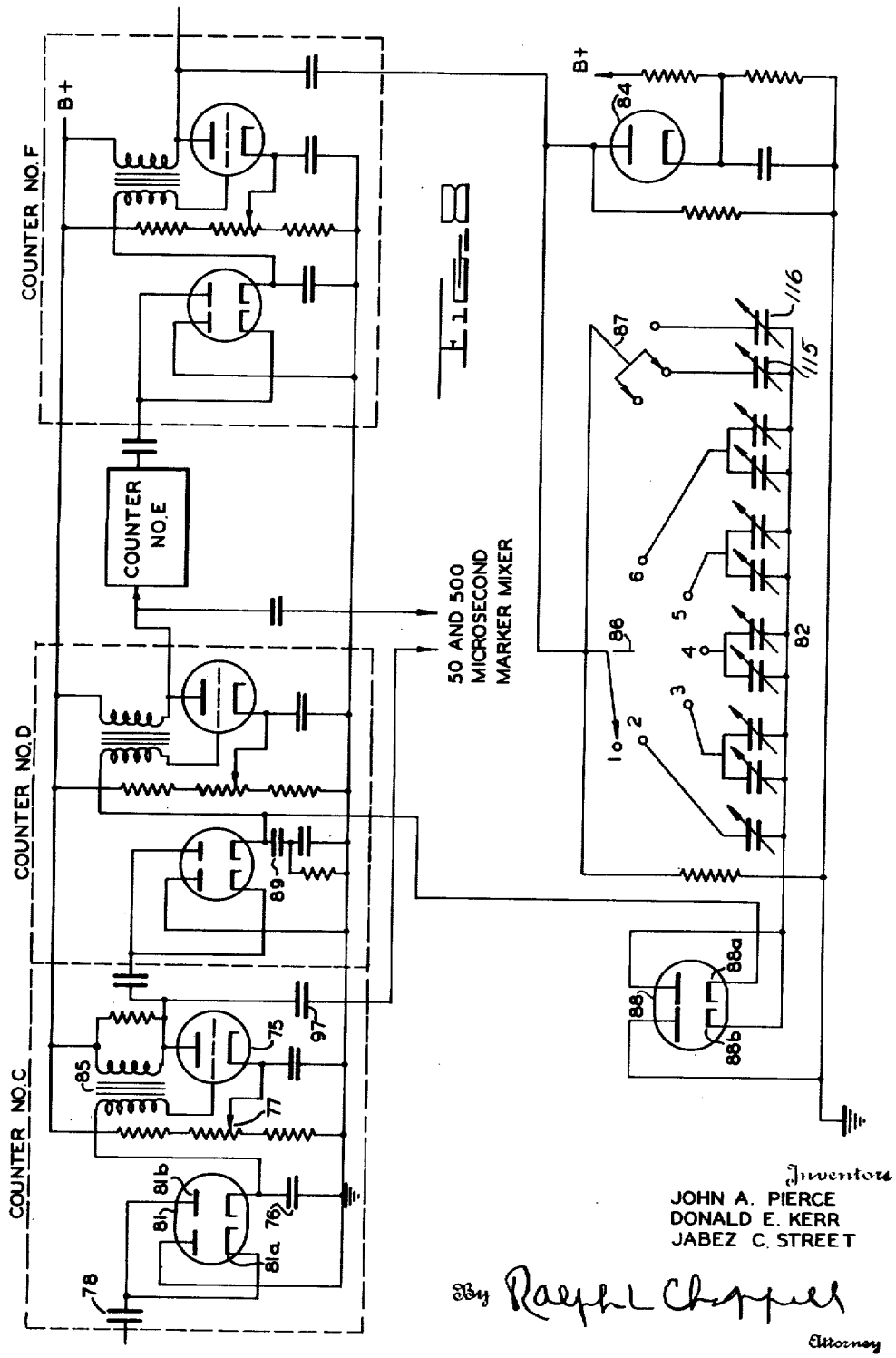

Sept. 14, 1954  J. A. PIERCE ET AL  2,689,346
LONG RANGE NAVIGATION SYSTEM
Filed June 13, 1945  6 Sheets-Sheet 5
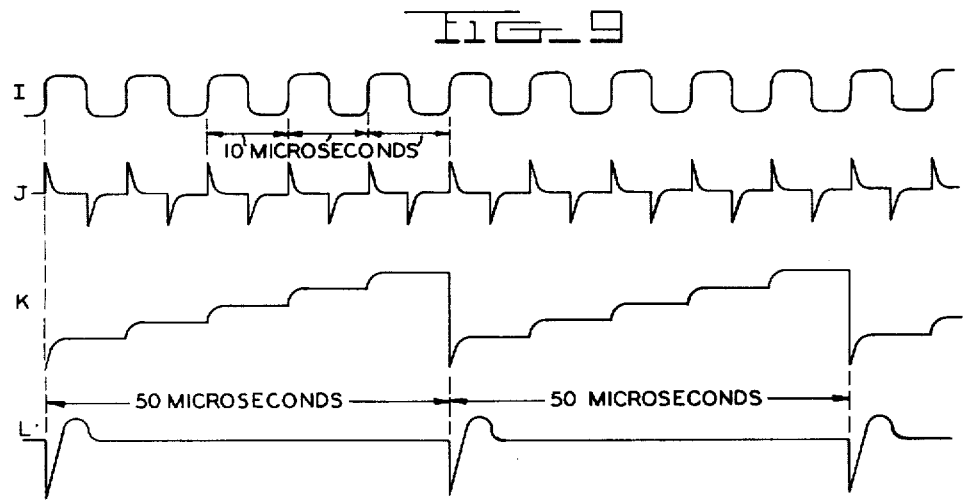
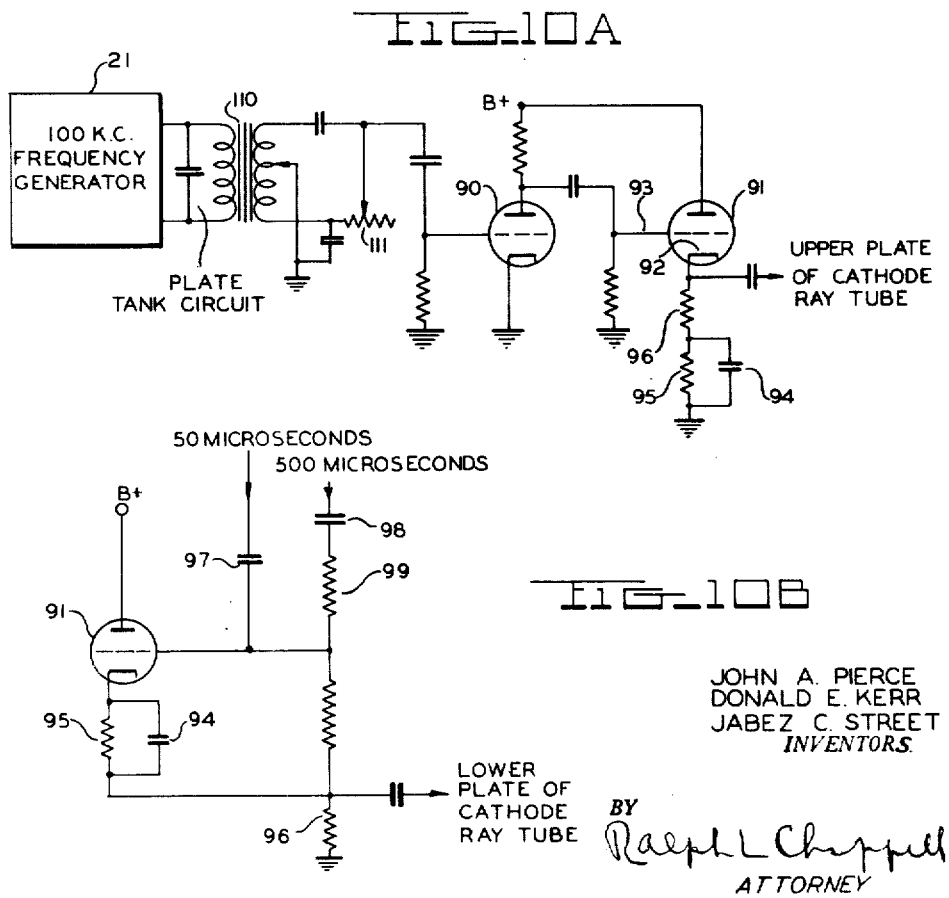
JOHN A. PIERCE
DONALD E. KERR
JABEZ C. STREET
INVENTORS
BY Ralph L. Chappell
ATTORNEY

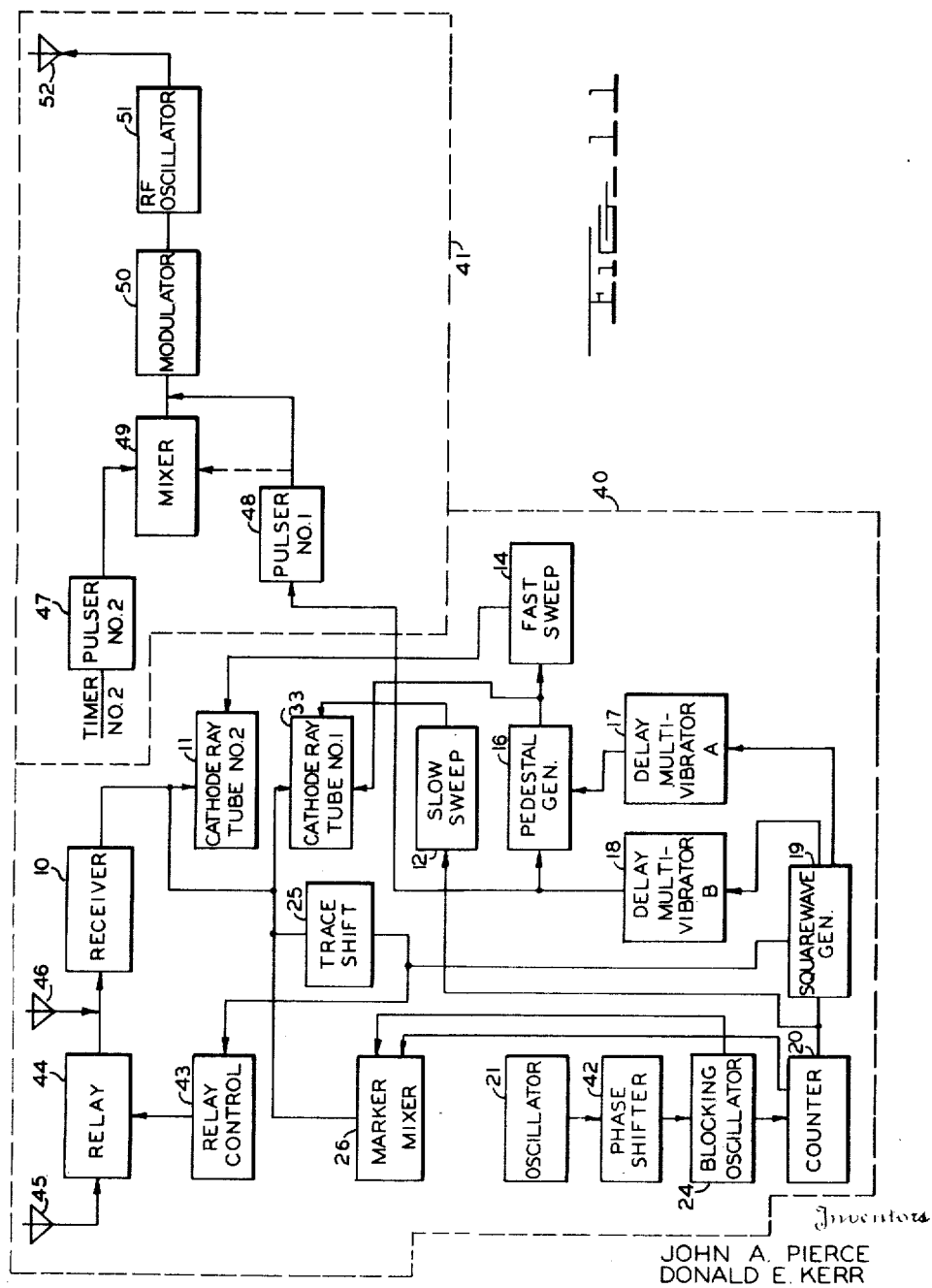

Patented Sept. 14, 1954

2,689,346

UNITED STATES PATENT OFFICE 2,689,346

LONG RANGE NAVIGATION SYSTEM

John A. Pierce and Donald E. Kerr, Boston, and Jabez C. Street, Belmont, Mass., assignors, by mesne assignments, to the United States of America as represented by the Secretary of the Navy Application June 13, 1945, Serial No. 599,163

26 Claims. (Cl. 343—103)

This invention relates to a position indicating system and particularly to a radio pulse type indicating system wherein a plurality of transmitting stations at known points radiate known time related pulse signals, which are detected at a receiver and timed with respect to each other, so as to indicate the difference in their propagation times, whereby the position of the receiver may be determined.

In accordance with the principles of this invention, the position of a receiver is determined by indicating thereat, the time difference in arrival of a pair of pulse signals emitted in a known time relation from a pair of distinctively remote points of transmission. In the preferred embodiment, this invention comprises a plurality of pairs of radio pulse transmitters, each of which are arranged to emit known time related pulse signals at a recurrence rate distinct from that employed by the other pairs, starting for example at 25 pulses per second and ranging upward therefrom in $\frac{1}{16}$ cycle steps from one pair to the next.

As above indicated, the pulse signals from each pair of stations are emitted in a known time relation, which will be understood to signify that they may be emitted either in synchronism or at different instants. For purposes of illustration, however, the latter method of pulse emission will be used to describe the operation of the invention.

As will later be described in detail, each station is operated under control of its own locally generated timing wave, while one station of each pair is assigned the duty of monitoring the time relation between its pulse emission and that of the other station of the pair so that any deviation therein from some predetermined value may be quickly observed and steps taken to correct it. For obvious reasons, the station assigned the responsibility of monitoring the time relation between its pulse emission and that from the other station of the pair will be called the "slave" and the other the "master."

It is an object of this invention to provide a means for maintaining the pulse emissions from a local radio pulse transmitter in a known time relation with those from a remote transmitter.

It is another object of this invention to provide a radio pulse position indicating system in which the difference in propagation time of known time related pulse signals received from a plurality of pairs of radio pulse transmitting stations at known locations may be used to indicate the position of the receivers.

It is another object of this invention to provide a pulse position indicating system of the foregoing type in which each of the pulse transmitting stations is operated under control of its own locally generated timing wave.

It is another object of this invention to provide a pulse position indicating system of the foregoing type in which at least one station of each pair monitors the time relation between its pulse and that of the other station of the pair.

It is another object of this invention to provide a radio pulse position indicating system of the foregoing type by which a navigator may obtain his position without sending out any signals or communicating with any of the transmitting stations.

Fig. 1 is a simplified view showing one manner of arranging the transmitting stations of the invention;

Fig. 2A is a time plot taken to suggest one suitable time relation to be held between the pulse emission of a pair of transmitters operating in accordance with the teachings of this invention;

Figs. 2B and 2C are face views of a cathode ray tube screen, taken to illustrate a preferred method of indicating at the receiver, the time difference in pulse arrival;

Fig. 3 is a simplified block diagram of the receiver;

Figs. 4A, 4B, 4C, and 5 are face views of a cathode ray tube showing in detail the preferred manner in which the time difference in arrival of known time related pulse signals emitted from a pair of distinctively remote points of transmission is measured;

Fig. 6 is a schematic diagram of the "Gain Control" circuit 15 shown in Fig. 3;

Fig. 7 is a circuit diagram of the "Delay Multivibrators" 17 and 18 shown in Fig. 3;

Fig. 8 is a circuit diagram of the electrical "Counter" unit 20 also shown in Fig. 3;

Fig. 9 shows a series of voltage time plots which are taken to illustrate the operation of the circuit shown in Fig. 8;

Figs. 10A and 10B are schematic diagrams of the time marker circuits used to graduate the time sweeps of the cathode ray tube as shown in Fig. 4A, and;

Fig. 11 is a simplified block diagram showing the organization of apparatus used at one of the "slave" transmitting stations shown in Fig. 1.

The manner in which the pulse transmitting stations of this invention are arranged to form a suitable navigational chain, or network, from which a receiver may obtain its position is largely dependent upon certain geographical considerations. One typical arrangement is shown in Fig. 1. Here the spacing between stations, which are shown along a shore line, is arbitrarily set, at say 300 miles, and the "master" and "slave" station of each pair are designated respectively by the letters "M" and "S" wherein the similar numerical subscripts attached thereto refer to the stations of the same pair.

To facilitate further discussion of the invention let it be assumed that a receiver, situated at point P in Fig. 1, is desirous of obtaining its position. As observed from the figure the distances C and D separating this point from the master and slave stations of one pair, $M_3$, $S_3$, are unequal which thus gives rise to a difference in the time required for the pulse signals emitted by this pair of stations to propagate to the receiver. These pulse signals are emitted in a fixed time relationship, and there will ordinarily be a difference in their time of arrival at the receiver, since the time lag of the slave pulse behind the master is in practice made sufficiently great to prevent both pulses arriving at the same time. This difference is readily indicated, in a manner to be more fully described, on a cathode ray tube. Knowing the emission time relationship and the arrival time difference, the receiver can identify the stations and determine the difference between the distances to each. This establishes its position at some point along one of the curves F and G. Each curve is a spherical hyperbola, since from geometry a spherical hyperbola is described by the locus of points which represent a constant difference of angular distance from two other fixed points on a sphere. The receiver can further, as will be presently apparent, determine along which of the curves F and G it is positioned. If positioned along curve F, the intersection of this curve with a similarly obtained curve H will give the exact position P of the receiver. This observation will be true on spherical surfaces only. For global navigation it becomes necessary to make corrections in the curves for the oblateness of the earth, but such tables are readily computed and used.

The center line O—O' is located mid-way between the stations $M_3$ and $S_3$ such that any point thereon is the same distance from both stations. Any point a given difference in distance from the stations $M_3$ and $S_3$, other than zero, may lie on either one of similar curves drawn on each side of the center line O—O' such as curves "F" and "G," for instance, each of which represent the same difference in distance from the station. Therefore if the pulse signals are emitted synchronously from each pair of stations then only the difference in propagation time will be detectable, which merely establishes the fact that the receiver lies on one of two hyperbolas on opposite sides of the center line O—O' and without the use of some radio goniometric means, the navigator will be unable to ascertain on which hyperbola the receiver lies. On the other hand, if the pulses are emitted alternately, for example, such that the first pulse to be emitted will be the first to be received regardless of the position of the receiver relative to stations, then the time difference in pulse arrival will depend in part on which side of the center line O—O' the receiver is situated. For example, if the master station emits a pulse first, then when the receiver is on the master station side of the center line O—O' the time difference in pulse arrival will be greater than the time interval separating their instants of emission; and if the receiver is on the slave side of the center line O—O', the time difference in pulse arrival will be less than the interval separating their instants of emission. Thus one of the advantages attributable to emitting the pulse signals at distinct instants is that absolutely no confusion can arise as to which side of the center line the receiver lies. Then, if the navigator has before him, knowledge of the time interval separating the pulse emissions and a map which contains a family of interpolative curves plotted relative to each pair of stations and labeled in terms of "time difference," the problem of position determination resolves itself to one of merely ascertaining the time difference in arrival of the pulse signals.

In keeping with the preferred manner of pulse emissions there is arbitrarily assigned a known and fixed time interval, known as the "absolute delay," between the emission of the pulse signal from the master station and that from the slave, such as, for instance, that indicated in Fig. 2A. Here it is assumed that the "master" station emits a pulse at zero time and the "slave" station at a time $T/2+X+Y$ later, where $T/2$ is one-half the pulse recurrence period, X is the time required for a pulse to propagate between the stations, and Y is an arbitrary coding delay. Thus in this way the time interval from A or "master" pulse to the B or "slave" pulse is always greater than the interval from the B pulse to the A pulse, provided that Y is not taken in the negative sense, regardless of the position of the receiver relative to the stations, and therefore, the time difference in pulse arrival, which the navigator observes, will positively locate the receiver on just one of the hyperbolas. The accuracy of this system, obviously depends to a great extent on the ability of the transmitting stations to maintain within very close limits the chosen interval between their pulse emissions. For this reason, there is provided, at least at the "slave" station, a cathode ray tube arrangement for monitoring the time relation between its pulse signal and that emitted from the "master" station. In most respects this monitoring system is identical to that used at the receiver for indicating the time difference in pulse arrival and will therefore now be described as applied to the receiver.

Reference is now had in particular to Fig. 3 wherein there is shown a simplified block diagram of a preferred arrangement which is used at the receiver for indicating the time difference in arrival of the pulse signals. The first pulse signal to be transmitted by one pair of stations, that is, the "master" station pulse, is picked up by the receiver 10 where it is detected, amplified and applied to one of two horizontal sweep lines appearing on the cathode ray tube 11, as shown at A in Fig. 2B. Thereafter the "slave" station pulse signal is likewise picked up by the receiver 10 and applied to the other of the two horizontal sweep lines appearing on the cathode ray tube 11, as shown at B in Fig. 2B. These sweeps are produced by the slow sweep generator 12 in response to the output from the counter circuit 20. The latter in turn is arranged to produce suitable positive keying pulses at a frequency twice the recurrence rate of the received pulse signals so that the sweeps thus produced will be arranged so that the second sweep is equal in time duration to the first sweep and is actually a continuation thereof except that it appears in a lower horizontal plane, as will be described hereinafter. To control the production of these sweeps, the counter 20 is arranged to be driven from a 100 kc. frequency generator 21 working through a squaring amplifier 23. The frequency generator 21 is preferably a crystal controlled type of oscillator whose frequency is stabilized by disposing its crystal and other related R. F. components in a thermostatically controlled constant temperature oven as indicated at 43. The squaring amplifier is provided for a purpose which will become apparent hereinafter, and may consist of simply a single vacuum tube which is biased so as to be driven beyond both cut-off and saturation by the oscillator output. Therefore, if it is desired to run a time difference measurement on a pair of stations which are tuned to operate at a recurrence rate of 25 pulses per second, the counting factor of the counter 20 is adjusted, by means later to be described, until the output therefrom is twice this rate, or 50 pulses per second, fed in parallel to the slow sweep generator 12 and the square wave generator 19. The slow sweep generator 12 is simply a saw-tooth voltage generator such as a simple non-conducting triode vacuum tube, having a plate load resistance and a charging condenser connected between its plate and cathode. Its output which is taken from the plate of the triode is coupled through switch 13, when the latter is in the down position, to the horizontal deflecting plates of the cathode ray tube 11. Thus when a positive keying pulse from the counter 20 is applied to the grid of the triode of the slow sweep generator 12, the charging condenser first renders a rapid discharge through the tube and thereafter starts a gradual charge through the plate load resistance which operates to move the cathode ray tube beam slowly from left to right at such a rate that as the beam just reaches the right hand edge of the tube, a second keying pulse strikes the grid of the triode to cause the beam to fly quickly back to the left-hand edge and start a second sweep. Theoretically, at a sweep recurrence rate of 50 sweeps per second, each sweep should be equal to $T/2$ or 20,000 microseconds in duration, but in practice each sweep is more nearly equal to 19,930 microseconds in duration with the remaining 70 microseconds consumed in the fly-back period of the sweep when the beam returns to the left-hand edge of the cathode ray tube screen.

Obviously unless some means is provided for alternately changing the bias on the vertical deflecting plates of the cathode ray tube from one value to another during the production of the sweeps, there will be no way of distinguishing the first sweep from the second. For this reason, the square wave generator is provided, which is preferably a familiar two tube Eccles-Jordan type of multivibrator. This multivibrator as mentioned above is driven by the output of the counter 20 and produces on the plates of the opposite tubes a push-pull rectangular voltage wave having a frequency equal to one-half the frequency of its keying pulses and with the half cycles thereof equal in time duration to the cathode ray tube sweeps and synchronized therewith. One of the push-pull outputs taken from the plate of one of the tubes of the square wave generator 19 is applied to the vertical deflecting plates of the cathode ray tube 11 through a trace shift circuit 25. The latter may consist of any suitable means for regulating the amplitude of the rectangular voltage wave applied to the vertical deflecting plates, while the phase of the rectangular voltage applied thereto is such that as the counter output keys the sweep generator 12 to produce one horizontal sweep, a half cycle is applied to one of the vertical deflecting plates to deflect the electron beam upward and an opposite half cycle is applied thereto during the production of the next successive sweep. Thus, it is seen that successive sweeps occur alternately in upper and lower horizontal planes as shown in Fig. 2B.

To facilitate a measurement of the time difference in pulse arrival, there is applied to each of the sweeps a time controllable pedestal, on which the respective pulse signals are to be disposed, as shown in Fig. 4A, so that the relative positions of the pedestals will indicate the time difference of pulse arrival. These pedestals are produced in the following manner. The same output voltage from the square wave generator 19 that is applied to the trace shift circuit 25 is also applied to the multivibrator 17 through a differentiating circuit 24. Differentiating circuit 24 produces positive pulses at the leading edges of the positive square wave half cycles (which points correspond to the start of the upper sweep) and negative pulses at the trailing edges of the positive square wave half cycles. The multivibrator 17 is preferably a known type of bias control multivibrator which produces, in response to the positive pulse output from the differentiating circuit, a fixed time duration positive voltage pulse the trailing edge of which keys off the pedestal generator 16. The latter is a known type of asymmetrical multivibrator which produces a fixed amplitude and time duration (about 100 microseconds) negative pulse which is applied to the top or first sweep by way of the lower vertical deflecting plate of the cathode ray tube and at a time delayed from the initiation of the sweep equal to the time duration of the voltage pulse generated by the delay multivibrator 17. The phase opposed output from the square wave generator 19 as taken from the plate of the other tube in the square wave generator 19 is applied to the delay multivibrator 18 such that the leading edge of the positive half cycle therefrom, which corresponds in time to the initation of the second sweep is differentiated and applied as a keying pulse to the delay multivibrator 18. The latter, like multivibrator 17, is a known type of bias control multivibrator, and produces a pulse whose time duration is controlled, for example, by a potentiometer disposed in the circuit in a known manner, such that the trailing edge thereof keys off the pedestal generator 16 to produce a pedestal on the second beam sweep, delayed in time from the sweep initiation by an amount equal to the duration of the pulse generated by the multivibrator 18. To measure the time difference in pulse arrival the phase of the sweeps are altered by adjustment of the frequency of the oscillator 21 until the pulse considered to have emanated from the master station, designated in Fig. 4A as the "A" pulse, lies, for example, near the leading edge of the first pedestal. Thereafter the position of the second pedestal is adjusted by manipulation of the potentiometer in multivibrator 18 until the pulse from "slave" station, here designated as the "B" pulse, lies at a point on this pedestal which corresponds exactly to that occupied by the "A" pulse on the first pedestal.

In preparing a chart for use with the invention, the hyperbolas are marked with a time difference reading expressed in terms of $X+Y+K$, where K is equal to the difference in pulse propagation time, the sign of which is dependent upon which side of the center line O—O' the receiver is situated. Thus the center line O—O' will simply contain a marking $X+Y$ since $K$ is equal to zero at any point thereon, while the hyperbolas to the "master" and "slave" station side of the center line O—O' will be marked respectively with time difference ratings greater and less than the center line rating, by amounts equal to the difference in pulse propagation time $K$. Then, as will be seen hereinafter, by referring the position of the first pedestal to the second sweep line, as indicated by the dotted vertical line in Fig. 4A, the relative position of the first and second pedestals as they appear on the second sweep line will provide a "time difference measurement" in terms of $X+Y+K$. In this way, as will be noted, the factor $T/2$ which is omitted in the plotting of the hyperbolas is compensated for at the receiver by referring the first pedestal to the second sweep. Hereinafter, the use of the term "time difference measurement" will be understood to be a measurement of the relative time position of the two pedestals as they appear on the second sweep line and not the actual time difference in pulse arrival.

In the process of positioning the "master" station pulse "A" on the first pedestal, the slave station pulse "B" may often be mistaken for the "A" pulse, in which event both pulse signals may appear on the top or first sweep as shown in Fig. 2C. This is due to the fact that the interval of time elapsing between the emission of a pulse from the "slave" station and that from the "master" station is equal to $T/2-X-Y$ and not $T/2+X+Y$.

As above mentioned the time difference in pulse arrival is made by observing the displacement of the leading edges of the respective pedestals as they appear on a single sweep line. Consequently, the time difference measurement made, will only be accurate when the pulse signals occupy exactly corresponding positions on their respective pedestals, which may be most easily attained in the following manner. The output from the pedestal generator 16, which is a negative pulse of about 100 microseconds in duration, is applied to a fast sweep circuit 14. This circuit may be essentially the same as the slow sweep generator 12 except in this case the triode tube is normally biased conducting so that the gradual charge of the condenser, which produces the visible movement of the cathode ray tube beam, will occur during the application of the negative pedestal to the grid of the triode. The saw-tooth voltages which result are then applied through switch 13 when the latter is in the up position to the horizontal deflecting plates of the cathode ray tube 11, so that the respective pedestals will now appear as the upper and lower traces somewhat as shown in Fig. 4B. Thus if the pulse signals appear at exactly corresponding points on their respective pedestals they will, on the fast sweep traces, appear exactly superposed, that is, one directly over the other. Thereafter, the spacing between the sweeps is reduced to zero by adjustment of the trace shift circuit 25 and the delay multivibrator 18, finally adjusted until pulse indications are exactly superimposed.

To indicate accurately the time displacement of the leading edges of the respective pedestals, and therefore, the time difference in pulse arrival, each of the sweeps are graduated with 10, 50 and 500 microsecond markers, as shown in Fig. 4A, and such that the time markers appearing on the first or top sweep will lie exactly in positional correspondence with the similar time markers appearing on the second or bottom sweep. Here the small divisional markers designated at 32 represent the 50 microsecond divisions while the larger markers 31 represent the 500 microsecond divisions. For purposes of simplifying the illustration, the 10 microsecond markers have been omitted, and only the first 4500 microseconds of each sweep shown. In graduating these sweeps the 10 microsecond markers are obtained directly from the 100 kc. source and applied to the upper vertical deflecting plate of the cathode ray tube, through the marker circuit 26, while the 50 and 500 microsecond markers are obtained from the appropriate points in the counter circuit 20 and applied to the lower vertical deflecting plate of the cathode ray tube, through the marker circuit 27.

In making the "time difference measurement," the first pedestal is set at a fixed point on the first sweep, for instance, so that its leading edge will exactly coincide with the second 500 microsecond marker pulse, then the time difference measurement will be made with respect to the corresponding point on the second sweep line. For example, in the case shown in Fig. 4A, the "time difference" in pulse arrival as observed from the respective pedestals is between 1600 and 1650 microseconds, the exact value of which may be determined by noting the relative position of the 50 microsecond marker pulses as they appear on the respective pedestals. That is, as the second pedestal is moved toward the 1650 microsecond division, it will be seen that the first 50 microsecond time marker appearing on the second pedestal will move toward the leading edge of this pedestal and therefore result in a further increase in placement between this time marker and the first 50 microsecond time marker pulse appearing on the first pedestal. To obtain the exact time measurement the sweeps on the cathode ray tube 11 are switched to the fast sweep circuit 14 to produce the fast sweep arrangement as shown in Fig. 4B. Here the small divisional markers 30 which point upward represent 10 microsecond divisions. Thereafter the fast sweeps and pulses A and B are superimposed, as shown in Fig. 4C by adjustment of the trace shift circuit 25 and the time interval elapsing between the first 50 microsecond division appearing on the second or bottom sweep and the next 50 microsecond division to the right on the first or top sweep is observed, which is here shown as two 10 microsecond divisions or 20 microseconds. Thus, the exact time difference in pulse arrival is measured to be 1620 microseconds, which when compared with a time difference of say 2500 microseconds which represents the time marking on the center line O—O', it will be observed that the receiver lies to the slave station side thereof.

In folding one fast sweep into the other, as shown in Fig. 4C, it is readily obvious that both pulse signals must be made of equal amplitude in order to maximize their positional correspondence on the respective pedestals. Consequently, the gain of the receiver 10 must be properly altered to make up for the difference in detected amplitudes caused by the difference in the distances separating the receiver from the respective transmitting stations. The organization of such a circuit with respect to the rest of the apparatus is shown in block 15 of Fig. 3 and is operated from the output of the square wave generator 19. In Fig. 6 this circuit is shown in detail consisting of a pair of push-pull cathode follower tubes, 100 and 101, each having a cathode resistance, 102 and 103, and the resistance of a potentiometer 104 disposed across their cathodes. A push-pull input obtained from the square wave generator 19 is applied to the grids of the tubes causing their respective cathodes to rise and fall alternately in phase opposition. Thus if the output from the square wave generator 19 is suitably balanced, the cathode voltage of one tube will rise at one instant while the cathode of the other tube will fall an equal amount at the same instant. Hence the mid-point of the potentiometer 104 will remain at a constant potential while points to the right and left thereof will rise and fall in phase opposition. For example, a point to the left of the mid-point of potentiometer 104 will rise during the production of the first or top sweep and fall during the production of the second or bottom sweep. Simultaneously a point to the right will undergo a phase opposed voltage alternation. Therefore, the output from the push-pull circuit as obtained from the movable arm of potentiometer 104 can be applied through the cathode follower 107, for instance, to a suitable point in the receiver for increasing the gain thereof during the reception of the "A" pulse and reducing the gain during the reception of the "B" pulse or vice versa, by an amount necessary to equalize their amplitudes. A like circuit may be used for the trace shifter 25 to control the amount of sweep separation.

The foregoing method of making a time difference measurement may be used when there is one pulse received from each station such as the ground wave pulse received during diurnal operation. At night, however, due to reflections from the ionized layers in the atmosphere such as the E layer, a plurality of pulses may be observed. Fig. 5 represents the time relation the reflected pulse signals may assume. Any pulse in one of these trains may be matched against any pulse in the other train by manipulation of the controls. Therefore the proper pulse in each train must be selected in order that the reading may yield the correct time difference. The ground wave pulse, if one is received, will always arrive first so that its position will be to the left of the other pulse signals and it does not, if visible, change shape. Therefore, when making a measurement where several pulses are present the following rules should be observed:

(a) Use the ground wave pulses if they are received from both stations.

(b) If no ground wave pulse is received from either station, use the first reflected wave.

(c) If a ground wave pulse is received from one station and not from the other, disregard the ground wave and make the measurement using the first reflected pulse signals. In general, the ground wave is usually accessible, but at times the first E layer reflection must be used. In this event, a correction for the change in time of transmission must be administered. These corrections may be listed in conveniently prepared tables and may be easily used when the occasion arises.

Reference is now had in particular to Fig. 8 wherein the counter circuit 20 is shown in detail, comprising a series of tandem connected counter circuits C, D, E, and F each similarly constructed and operated. To simplify the illustration, only the first counter circuit C will be described in detail. Each counter comprises a blocking oscillator 75 and a voltage accumulating condenser 76. The cathode to ground voltage of the blocking oscillator is maintained at a constant value well in excess of the grid to ground voltage, by adjustment of potentiometer 77. In operation, as the 100 kc. output from the squaring amplifier 23 goes alternately positive and negative, small positive and negative pulses of current pass through the charging capacitor 78. The negative pulses pass directly to ground through the first section 81a of the twin diode 81 while the positive pulses pass through the second section 81b to the storage condenser 76. As they cannot return through the diode, the potential on the storage capacitor 76 is raised one step above ground for each positive input. The cathode of the blocking oscillator 75 is adjusted to about 58 volts above ground, for instance, by the potentiometer 77, while capacitor 78 and the input pulses applied by the squaring amplifier 23 are adjusted to increase the grid bias about 10 volts per step. Thus counting from a time when there was no charge on 76 the fifth step to the first counter will increase the grid potential of the blocking oscillator to a value where plate current will flow. The plate current passes through the primary of transformer 85 to induce a positive rise in grid voltage which in turn increases the plate current to thus give the tube to saturation in a very short time, whereupon grid current will flow to thus discharge condenser 76. At this point, the voltage at the grid swings sharply negative to cut the tube off and the plate current ceases. The negative charge stored on 76 by reason of grid current is immediately bled to ground through the first section and second section of the diode 81, and the counting cycle is repeated. The other counter circuits D, E, and F operate similarly except some are arranged to count down by different factors.

A graphical illustration of the action of the counter circuit C is shown in Fig. 9. The first plot "I" represents the 100 kc. input to the counter circuit as obtained from the squaring amplifier 23. Plot "J" represents the current impulses applied to the double diode 81. Plot "K" represents the manner in which the storage condenser 76 accrues a charge and plot "L" shows the change in blocking oscillator plate voltage in response to the fifth positive input pulse. It will be observed that the output pulse from the first counter C will normally substantially coincide with every fifth input pulse applied thereto. In the present counter chain, the four counter stages C, D, E, and F are arranged to count down by 5, 10, 5 and 8 respectively. In this order the time separating the output pulses from the blocking oscillators of the respective counters are 50 microseconds, 500 microseconds, 2,500 microseconds and 20,000 microseconds. It will be observed that the interval of time elasping between the output pulses from the last counter F, exactly matches the time consumed in generating one sweep trace, and that the outputs of the first two counters C and D are exactly that needed for the 50 and 500 microsecond marker pulses. Now then, since the slow sweep generator 12 is operated in response to the output from the final counter F which in turn is driven by the preceding counter stages, it is clear that for any given sweep rate the 50 and 500 microseconds time markers which are obtained from the respective blocking oscillators of the C and D counter stages will always lie in positional correspondence on each of the respective sweeps. To regulate the frequency output of the counter circuit to correspond to that required to control the various transmitter stations, a system of feedback is employed which will now be described. It was observed that normally it required 8 output pulses from the E counter to produce one output from the F counter, five output pulses from the D counter to produce one output pulse from the E counter and 10 output pulses from the C counter to produce one output pulse from the D counter. Therefore, 400 output pulses from the C counter stage are required to produce one output pulse from the F counter stage. The feedback circuit used to alter the output frequency of the counter chain is shown in the lower part of Fig. 8.

In Fig. 8 the biased diode 84 acts as a voltage limiter which is used to define the size of the F counter output which is applied to the feedback circuit. Switch 86 and the capacitors connected thereto, indicated in general at 82 simply form an eight position variable condenser with independent adjustment of the various step values. These condensers and double diode 88 function exactly as condenser 78 and double diode 81 do in the first counter stage. In other words, condenser 82 differentiates the pulse applied to the arm of switch 86, as well as controlling the size of the differentiated feedback pulse as the position of the switch arm is varied. The negative part of the differentiated feedback pulse is short circuited to ground through the section 88b of the diode 88, while the positive portion of the feedback pulse is applied through the first section 88a to the storage condenser 89 of the D counter. In this manner the first flight of charging steps on the D counter is shortened, but the next 39 flights of charging steps before an output from the F counter is realized remains unchanged. In this manner only the first 500 microseconds of each sweep is altered, preserving, as will hereinafter be seen, the linearity of the marker pulses on the remaining portion of the sweeps. For example, in the number 4 position of the switch 86, the feedback pulse will apply a charge on condenser 89 which is equal to three times that which an output pulse from the C counter will apply. The effect of the feedback pulse is therefore to raise the starting level of the first flight of charging steps, after which the steps increase in the normal manner until the counter D blocking oscillator is tripped. Obviously this feedback pulse will cause the D counter to trip three steps (each 50 microseconds) earlier than when no feedback is used. Thus the period between output pulses from the F counter has been changed from 20,000 microseconds with no feedback to 19,850 microseconds, which corresponds substantially to a frequency of 50⅜ cycles. Hence switch 86 is therefore, in fact, a station selector switch which is carefully marked and operated to synchronize various stations in the navigation network. For example, in the number 1 position of switch 86 no feedback is present, so the periodicity of the sweep is correct for the 25 pulse per second station and the next position of the selector switch is correct for the 25 1/16 pulse per second pair of stations and so on.

Switch 87 and the condensers, 115 and 116, which may be connected to it, may be operated momentarily to augment the size of the feedback pulse and thereby serve as a phase shifter for the sweeps in the process of positioning the master station pulse on the first pedestal.

Reference is now had to Fig. 10A and 10B wherein there is shown the 10 microsecond marker circuit and the 50 and 500 microsecond marker circuits respectively, the organization of which, with respect to the remaining apparatus, is shown at 26 and 27 in Fig. 3. In the 10 microsecond marker circuit the output from the crystal oscillator is fed through an amplifier 90 and cathode follower 91 to the upper vertical deflecting plate of the cathode ray tube indicator 11. The cathode 92 will follow the grid 93 for the first few cycles after which condenser 94 becomes charged to nearly the grid potential swing, following which condenser 94 and resistor 95, being a long time constant circuit, act as a bias to the cathode 92 of the cathode follower to cut the tube off over most of the input cycle. During the very peaks of the input to the grid 93, however, a small positive voltage will appear across resistance 96 which passes on to a plate of the cathode ray tube and produces the upward pointing markers. A phase shifter is used to delay the 10 microsecond marks slightly, so that every fifth 10 microsecond marker can be made to coincide with a 50 microsecond marker. The center tapped secondary of transformer 110 is coupled to the plate tank coil of the 100 kc. oscillator. Part or all of the resistor 111 is across the secondary coil whose center tap is grounded. As the arm of potentiometer 111 is adjusted the output is in effect taken from the lower end of the coil, the upper end or some intermediate point. Since opposite ends of the secondary coil are in phase opposition, the phase of the output signal may be varied nearly 180° or 5 microseconds in time. The 50 and 500 microsecond marker mixer circuit shown in Fig. 10B operates substantially in the same manner as the 10 microsecond marker circuit with the exception that the bias circuit, including condenser 94 and resistor 95, has a smaller time constant circuit and therefore permits a greater amplitude in the voltage developed across resistance 96. The 50 microsecond pulses obtained from the output of the C counter blocking oscillator are applied through condensers 97, while the 500 microsecond pulses obtained from the output of the D counter blocking oscillator are applied through condenser 98. Condensers 97 are adjusted to attenuate the 50 microsecond markers to a greater extent than condenser 98 does the 500 microsecond marker so that the 500 microsecond markers obtained from the circuit will be of much greater amplitude than the 50 microsecond markers, and therefore, more readily distinguishable on the cathode ray tube. Resistor 99 is interposed between the 50 and 500 microsecond marker connection to tube 91 so as to prevent the C and D counter stages from reacting on each other. The output of this circuit is then applied to the deflecting plate of the cathode ray tube opposite to the plate to which the 10 microsecond markers are applied to cause these markers to point downward on the sweep trace.

As suggested above, the delay multivibrators 17 and 18 may be of the familiar bias control type such as that shown in Fig. 7 capable of producing an accurately known variable time duration pulse. This circuit consists of a pair of triode vacuum tubes, 62 and 63, which have their cathodes connected to ground through a common cathode resistance 67. Tube 63 has its grid returned to B+ through resistance 65 so that it is normally held conducting. The plate resistance 64 is then made of such a value that the current passing through tube 63 and cathode resistor 67 is of such a value as to bias tube 62 to cut-off by virtue of the voltage drop across the cathode resistor 67. In the operation of this circuit, as the delay multivibrator 17 for instance, the leading edge of the output from the square wave generator 19 which corresponds to the initiation of the first or top sweep, is differentiated and applied through condenser 69 as a positive pulse to the grid of tube 62, thereby rendering tube 62 conducting and hence dropping its plate voltage. The drop in plate voltage is then transferred through condenser 66 to the grid of tube 63 to cut off current flow through the latter. Thereafter, condenser 66 begins to charge exponentially through resistance 65 to correspondingly raise the grid voltage of tube 63 until condenser 66 has charged to a point to approach the cathode voltage developed across resistance 67 and hence render tube 63 conducting again. It may then be observed that the current passed by tube 62 when it is conducting will depend upon the bias applied to its grid which determines the voltage developed across cathode resistor 67 and hence the amount of charge condenser 66 has to accrue before it may overcome the cut-off bias across the cathode resistor. Therefore the bias control for tube 62, potentiometer 61 and switch 71, determines the length of time that tube 63 is held non-conducting and thus the time duration of the positive pulse produced on its plate. The more positive the grid bias on tube 62 the longer the pulse output from tube 63.

When this circuit is used as the delay multivibrator 17 which controls the time occurrence of the "A" pedestal, it is usually desired to lock the "A" pedestal on the top sweep a whole number of 500 microsecond divisions after sweep initiation. Pedestal locking may be accomplished by feeding the negative 500 microsecond pulses which are obtained from the blocking oscillator of the D counter stage in the counter chain to the grid of tube 62 through condenser 70. These markers appear as positive pulses on the plate of tube 62 and are in turn applied to the grid of tube 63 through condenser 66 so that they restore tube 63 conducting at a time coincident with the desired 500 microsecond marker pulse. In this manner the pedestal which is produced in response to the trailing edge of the output pulse from tube 63 is sure to occur an integral number of 500 microsecond time markers following sweep inception.

Under normal counter operations, i. e., where no counter feedback is used, an interval of 1000 microseconds' delay, two 500 microsecond divisions) is maintained between the initiation of the top sweep and the "A" pedestal. In position "1" of the feedback circuit of Fig. 8 the length of each sweep is shortened by 50 microseconds, as described above. Now then, since the output of the final counter circuit does not only actuate the feedback circuit but also the operation of the slow sweep generator 12, all 500 microsecond markers will be displaced 50 microseconds from their original position. As the amount of feedback is increased the displacement of the 500 microsecond markers is likewise increased. Thus over the range of feedback positions from zero to maximum, the delay of the "A" pedestal will be changed from 1000 microseconds to 650 for example. In order to facilitate the locking of the "A" pedestal on the second 500 microsecond time marker at different amounts of counter feedback the grid bias control of tube 62 is varied in steps by manual adjustment of switch 71 and in accordance with the amount of counter feedback used. That is, switch 71 controls in steps the bias voltage on the grid of tube 62 and therefore should be adjusted to a high positive bias or in its uppermost position with zero counter feedback and in its lowermost position when maximum counter feedback is used. Proper positioning of the "A" pedestal is indicated when its leading edge is adjusted to coincide with the second 500 microsecond marker.

In controlling the position of the "B" pedestal two such circuits as 17 connected in series are used to constitute the delay multivibrator 18. The first is a coarse delay multivibrator section operating substantially identically to that of Fig. 7 and contains a range of at least 1000 to 11,000 microseconds regulated by potentiometer 61 in 500 microsecond steps. This delay is also locked in by the action of 500 microsecond marker pulses applied to the multivibrator as above described.

The second multivibrator section contained in delay multivibrator 18 is a fine delay type constructed similarly to that described except for the absence of the locking pulses and of switch 71 and whose output pulse is smoothly controlled by a potentiometer such as 61.

Reference is now had more particularly to Fig. 11 wherein there is illustrated the organization of apparatus employed at one of the transmitting stations of the invention. In this illustration there is shown a pulse time monitoring system enclosed within the dotted lines 40 and an R. F. oscillator and modulator circuit indicated generally at 41. The various components used in the timing circuit 40 such as the crystal oscillator 21, counter circuit 20 and, etc., are substantially identical to those hereinbefore described and therefore are designated by similar reference characters and functions. There is one exception, however, a phase shifter 42 and blocking oscillator 24 replace the squaring amplifier 23, interposed between the output of the standard frequency generator 21 and counter circuit 20 and operate to control both the phasing of the slow sweeps on the cathode ray tube and the pulsing of the local power oscillator 51 as will hereinafter become apparent. The blocking oscillator is a free running type adapted to operate at the frequency (100 kc.) of the standard frequency generator 21 and to be synchronously keyed thereby. The phase shifter 42 is of any known suitable type such as a space quadrature, plate affair to which phase quadrature components of the standard frequency generator output are applied in such a manner that as the rotor plate from which the output is taken is rotated the output will undergo a 360° phase shift for each revolution. Now then, since the blocking oscillator 24 is synchronously keyed by the output of the phase shifter 42 (at the very peak of the positive loop, for instance) it is apparent that although only a 360° phase shift is available from the output of the phase shifter, any conceivable degree of phase shift (200 π for example) is obtainable in the blocking oscillator output by continuously changing the phase of the generator 21 output voltage in the same sense by the phase shifter 42.

In general, the arrangement shown is adapted to operate as a "slave" station the function of which is to monitor the time relation between the emission of its pulse and that of the master station and to correct any deviation occurring therein. In operation the counter circuit 20 and pedestal generator 16 again key off respectively the slow and fast sweep circuits 12 and 14. The present arrangement differs, however, from the receiver in that both a fast sweep indicator 11 and a slow sweep indicator 33 are used. In this manner an overall picture of the operation of the pulse transmitter and pulse monitoring system can be observed from the slow sweep indicator while the time relation between the "master" and "slave" stations pulse emissions can simultaneously be monitored and rigidly maintained by keeping the respective pulse indication exactly superimposed on the fast sweeps.

As may be seen from the figure, the trailing edge of the output pulse from the multivibrator 18 which controls the position of the second pedestal also is fed to the pulser 48 which in turn operates the R. F. oscillator 51 through modulator 50. In this way, the local pulse emitted from the antenna 52 will always appear on the second pedestal delayed from the leading edge thereof by an amount dependent upon the cumulated delay in the transmitter and receiver circuits. Thereafter the phase of the sweeps is adjusted by manual operation of the phase shifter 42 until the distant or master station pulse signal is positioned at a point on the first pedestal corresponding to that occupied by the local pulse signal on the second pedestal. Then in operation as a "slave" transmitter, the second pedestal is adjusted to be displaced from the first pedestal by an amount of time equal to the coding delay $Y$ to the right of the first pedestal when the latter's position is referred to the second sweep. The other delays $T/2$ are accounted for by the use of a dual sweep system and $X$ is accounted for when the operation of the local transmitter is timed with respect to the arrival time of the distant pulse signal. Therefore in monitoring the time relation between a local pulse emission and that from the distant stations, their superimposed indications on the fast sweep indicator 11 are observed and carefully maintained by manual adjustment of the phase shifter 42.

The R. F. oscillator 51 is usually of a conventional design, such as a tuned grid-tuned plate affair, which is readily adapted to be pulsed by the modulator 50, which may be one of the known varieties of series modulators. Pulser 48 is of a type known to the art such as a Thyraton tube and associated pulse forming network arranged to produce a keying pulse for the oscillator of the proper shape and time duration. For instance, in relation to the other parameters of frequency and pulse recurrence rate, a radiated pulse of 40 microseconds' duration has been favorably employed. The pulser 48 triggers the modulator in response to the trailing edge of the output from the delay multivibrator 18.

As before mentioned it is vital to equalize the amplitudes of the pulse signal in order to obtain exact coincidence in their indications on the fast sweep, for which reason a second receiving antenna 45, relay 44 and relay control circuit 43 are provided and arranged to operate from the output of the square wave generator 19. In operation the leading edge of the first half cycle output from the square wave generator 19 which keys the multivibrator 17 does not affect the relay 44 so that both antennas 45 and 46 are connected in parallel in order to receive unattenuated the distant pulse signal. During the next half cycle output from the square wave generator 19, however, the relay control means 43 is activated so as to close relay 44 and hence short out antenna 45 leaving only the short local antenna 46 to receive the pulse emitted by the radiating antenna 52. If conditions were reversed so that the pulse radiated from antenna 52 occurred during the first half cycle output from the square wave generator 19, as in the case of a "master" station the relay 44 and relay control means 43 would be arranged to short out antenna 45 on the first half cycle output from 19. In addition to the twin antenna system, a receiver gain control circuit similar to that indicated at 15 in Fig. 3 may be provided if deemed necessary.

Thus far the transmitting station has been shown and described as a "slave" station operating at one of the terminal points in the chain such as $S_2$ or $S_4$ as shown in Fig. 1. To render the transmitter suitable for use as a "master" station, it is only necessary to connect multivibrator 17 to the pulser 48 in lieu of multivibrator 18 and adjust the latter to initiate the second pedestal at a time $T/2+2X+Y$ after the emission of a pulse from the antenna 52. In the case where the transmitter is to be situated at an intermediate point in the chain such as $M_1M_2$, two distinct pulse repetition rates are required since the transmitter must operate as part of two separate pairs of stations. Therefore a second timing unit including oscillator 21, phase shifter 42, counter 20 etc., should be provided, arranged and adapted to operate a second pulser 47. Since the pulse recurrence rate of different pairs of stations differs by only a fraction, some means for isolating the action of pulser 47 from that of 48 should be provided. Such a means is indicated as a mixer 49 which may consist for instance of a pair of diodes having their cathodes connected in parallel to a common load across which the output is taken and applied to the modulator 50 and their anodes tied to the outputs of the respective pulses.

Although we have shown and described only a certain and specific embodiment of the invention we are fully aware of the many modifications possible thereof. Therefore this invention is not to be limited except insofar as is necessitated by the prior art and the spirit of the appended claims.

We claim:

1. A means for maintaining a recurrent series of first pulse emissions from a first transmitter in a known time relation with a similar second recurrent series of pulse emissions from a second transmitter, comprising a cathode ray tube, a timing wave generator, means controlling said timing wave generator thereby to cause it to maintain synchronism with said first series of pulse emissions and to maintain any desired phase with respect to said first series of pulse emissions, means controlled by said timing wave generator producing a first and a second series of electron beam sweeps on said cathode ray tube, means for presenting said sweeps alternately in superimposed position, means for adjusting said first and second series of electron beam sweeps to have any desired time interval between them and for maintaining said interval substantially constant, and means for causing said second transmitter to emit a pulse substantially coincident with each of the said second series of electron beam sweeps, means for receiving said first and second series of pulses and displaying them upon said first and second series of electron beam sweeps respectively.

2. A means for maintaining a recurrent series of first pulse emissions from a first transmitter in a known time relation with a similar second recurrent series of pulse emissions from a second transmitter, comprising a cathode ray tube, a timing wave generator, means controlling said timing wave generator thereby to cause it to maintain synchronism with said first series of pulse emissions and to maintain any desired phase with respect to said first series of pulse emissions, means controlled by said timing wave generator producing a first and a second series of electron beam sweeps on said cathode ray tube, means for adjusting said first and second series of electron beam sweeps to have any desired time interval between them and for maintaining said interval substantially constant, means for causing said second transmitter to emit a pulse substantially coincident with each of the said second series of electron beam sweeps, means for receiving said first and second series of pulses and displaying them upon said first and second series of electron beam sweeps, respectively, means for equalizing the displayed amplitudes of the said first and second series of pulses, means for superimposing said first and second series of electron beam sweeps, and means for adjusting said means controlling said timing wave generator to maintain said first series of pulses visually superimposed upon said second series of pulses.

3. A means for maintaining a recurrent series of pulse emissions from a first transmitter in a known time relation with a similar recurrent series of pulse emissions from a second transmitter, comprising a cathode ray tube, means producing on said cathode ray tube a first sweep of the electron beam which is of a time duration comparable to the duration of said pulse emissions, means producing a second beam sweep on said cathode ray tube equal in time duration to said first sweep and superimposed thereon and delayed in time therefrom by some predetermined amount, means operating said first transmitter in response to the inception of one of said sweeps, means receiving and indicating on said one sweep the pulse emission of said first transmitter, means receiving and indicating the pulse emission of said second transmitter on said cathode ray tube, and means adjusting the phase of said sweeps without disturbing the time delay therebetween until the indication of the reception of said second pulse signal appears on the other of said sweeps superimposed on the indication of said first pulse signal.

4. A means for maintaining a recurrent series of pulse emissions from a first transmitter in a known time relation with a similar recurrent series of pulse emissions from a second transmitter, comprising means for generating a timing wave whose frequency is equal to the pulse repetition frequency of said transmitters, a cathode ray tube, means operative in response to said timing wave for producing on said cathode ray tube a first sweep of the electron beam which is of a time duration comparable to said pulse emissions, means operative in response to said timing wave for producing a second beam sweep on said cathode ray tube equal in time duration to said first sweep but superimposed thereon and delayed in time therefrom by some predetermined amount, means operating said first transmitter at inception of one of said sweeps, means receiving and indicating on said one sweep the pulse emission of said first transmitter, means receiving and indicating on said cathode ray tube the pulse emission of said second transmitter, and means adjusting the phase of said timing wave and thereby the phase of said sweeps without disturbing the time delay therebetween until an indication of the reception of said second pulse emission appears on the other of said sweeps superimposed on the indication of said first pulse emission.

5. A means for maintaining a recurrent series of pulse emissions from a first transmitter in a known time relation with a similar recurrent series of pulse emissions from a second transmitter, comprising means at said first transmitter for generating a rectangular voltage wave whose frequency is equal to the pulse repetition frequency of said transmitters, a cathode ray tube, means operating in response to the leading edge of positive half cycles of said rectangular voltage wave for producing on said cathode ray tube a first sweep of the electron beam of a time duration equal to the positive half cycle of said rectangular voltage wave, means responsive to the leading edge of the negative half cycles of said rectangular voltage wave for producing a second sweep of the electron beam equal in time duration to said first sweep, means producing and applying to said first sweep as a pedestal thereon a first voltage pulse comparable in duration to said transmitter pulse signals and delayed a fixed amount of time from sweep initiation, means producing and applying to said second sweep as a pedestal thereon a second voltage pulse equal in time duration to said first voltage pulse but delayed a controllable amount of time from the inception of said second sweep, means for graduating said sweep with a plurality of time markers, means adjusting the time delay between said first and second voltage pulses as desired and as guided by said time markers, means applying said positive and negative cycles to said cathode ray tube for separating the first and second sweep, and means for receiving said first and second emissions and connected to said cathode ray tube whereby the emission pulses may be displayed on said pedestals on said first and second sweeps.

6. A means for measuring the time difference between two regularly recurrent series of pulse emissions, comprising a cathode ray tube, a timing wave generator, a sweep generator controlled by said timing wave generator for producing a first and second electron beam sweep on said tube, means for separating said first and second sweeps on said tube, means receiving said pulse emissions and so connected to said tube that each series of pulses may be displayed on its respective sweep as a single pulse, means controlled by said timing wave generator for producing and applying a pedestal pulse to said first and second sweeps and so adjustable that a pedestal pulse occurs at the time of reception of each emission pulse, whereby an emission pulse will be displayed on a pedestal pulse on each of the sweeps.

7. A means for measuring the time difference between two regularly recurrent series of pulse emissions, comprising a cathode ray tube, a timing wave generator, means controlled by said timing wave generator for producing pedestal pulses and adjustable so that a pedestal pulse occurs at the time of reception of each emission pulse, a sweep generator responsive to said pedestal pulses for producing an electron beam sweep on said tube during the occurrence of each pedestal pulse, means receiving said pulse emissions and so connected to said tube that each series of pulses may be displayed as a single pulse on its respective sweep, and means for superimposing on the tube the sweeps of the respective series of pulse emissions.

8. A means for measuring the time difference between pulses of each of two synchronized recurrent series of pulse emissions, comprising a cathode ray tube, a timing wave generator, means controlled by said timing wave generator for producing upon said cathode ray tube two recurrent electron beam sweeps substantially synchronous with the said two recurrent series of pulses, means for receiving said pulse emissions and so displaying them on said cathode ray tube that each of the said two series of pulses appears on its respective series of sweeps, means for presenting said sweeps alternately in superimposed position, and means for adjusting said means producing said electron beam sweeps so that the time difference between said sweeps is substantially identical with said time difference between said pulses thereby to cause said pulses to appear substantially superimposed upon said cathode ray tube.

9. A means for measuring the time difference between pulses of each of two synchronized recurrent series of pulse emissions, comprising a cathode ray tube, a timing wave generator, means controlled by said timing wave generator for producing upon said cathode ray tube two recurrent electron beam sweeps substantially synchronous with the said two recurrent series of pulses, means for receiving said pulse emissions and so displaying them on said cathode ray tube that each of the said two series of pulses appears on its respective series of sweeps, means for superimposing said electron beam sweeps, means for adjusting said means producing said electron beam sweeps so that the time difference between said sweeps is substantially identical with the said time difference between said pulses thereby to cause said pulses to appear substantially coincident upon said cathode ray tube, and marker means for determining the time difference between said electron beam sweeps.

10. A means for measuring the time difference between two series of pulse emissions of the same repetition rate, comprising a cathode ray tube, a timing wave generator, a phase shifter connected to the output of said generator, a counter connected to the output of said phase shifter to produce a pulse train whose repetition frequency is adjustable to twice that of said pulse emissions, a sweep generator producing an electron beam sweep on said tube in response to each counter pulse, a square wave generator producing an alternately positive or negative wave in response to said counter pulses, a trace shifter operated by said square wave and adjustable to separate the sweeps on said tube corresponding to said positive and negative wave a desired amount, two adjustable delay multivibrators responsive respectively to the positive and negative edge of said square wave and producing pulses of desired delay with respect to said edges, a generator producing a pedestal pulse in response to said multivibrator pulses and connected to said tube to apply a pedestal to each of said sweeps, a receiver for receiving said pulse emissions and connected to said tube, whereby said emission pulses will be displayed on the proper trace upon adjustment of said phase shifter and said pedestals will coincide with said emission pulses upon adjustment of the delay of said multivibrators.

11. Apparatus for measuring the time difference between received pulses of two synchronized series of pulse emissions comprising, a cathode ray tube, means producing a pair of separated electron beam sweeps in a predetermined synchronous relationship with said series of pulse emissions, means receiving said pulse emissions and connected to said tube whereby each series of pulses may be displayed as a single pulse on its respective sweep, means to superimpose said separated sweeps to display a single pulse and means for determining the time difference between said sweeps.

12. Apparatus for measuring the time difference between received pulses of two recurrent series of pulse emissions comprising, a cathode ray tube, a sweep generator for producing a pair of separated electron beam sweeps on said tube, means receiving said pulse emissions and so connected to said tube that each series of pulses may be displayed as a single pulse on its respective sweep, means for superimposing said electron beam sweeps, means for adjusting the instant of initiation of said sweeps such that the pulses on the two sweeps are substantially superimposed, and means for determining the time difference between the initiation of said sweeps.

13. Apparatus for measuring the time difference between received pulses of two regularly recurrent series of pulse emission, comprising a cathode ray tube, a sweep generator for producing a horizontal electron beam sweep on said tube during the reception of each emission pulse, means receiving said pulse emissions and so connected to said tube that each series of pulses may be displayed as a single vertical pulse on its respective sweep, means superimposing the respective sweeps of said two series, and marker means for determining the time difference between said electron beam sweeps.

14. Apparatus for measuring the time difference between received pulses of each of two synchronized recurrent series of pulses emissions, comprising a cathode ray tube, means generating and producing upon said cathode ray tube two superimposed recurrent electron beam sweeps substantially synchronous with the said two recurrent series of pulses, means for adjusting said sweep generating means so that the time difference between said sweeps is substantially identical with the said time difference between said pulses, and marker means for determining the time difference between said electron beam sweeps.

15. Apparatus for measuring the time difference between two regularly recurrent series of pulse emissions comprising, means for receiving said pulse emissions, a cathode ray tube, means producing upon said cathode ray tube two superimposed recurrent electron beam sweeps substantially synchronous with the said two recurrent series of pulse emissions, and means for determining the time difference between said electron beam sweeps.

16. Apparatus for measuring the time difference between pulses of each of two synchronized recurrent series of pulse emissions comprising, means for receiving said pulse emissions, a cathode ray tube, means producing upon said cathode ray tube two recurrent electron beam sweeps substantially synchronous with the said two recurrent series of pulses, means for displaying said pulse emissions on said sweeps such that each of the said two series of pulses appears on its respective series of sweeps, means for adjusting the gain of said receiver whereby the pulses displayed on said two series of sweeps are of equal amplitude, means for superimposing said electron beam sweeps, and means for adjusting said sweep producing means so that the time difference between said sweeps is equal to the time difference between said pulses thereby to cause said pulses to appear substantially coincident upon said tube, and means for determining the time difference between said sweeps.

17. Apparatus for measuring the time difference between two synchronized series of pulse emissions of the same repetition rate comprising, a cathode ray tube, a timing wave generator, a counting circuit coupled to said timing wave generator for producing a pulse train whose repetition rate is adjustable to twice that of said pulse emissions, means responsive to said counterpulses producing an alternately positive and negative wave, a pair of adjustable delay multivibrators responsive respectively to the positive and negative edge of said wave and producing a pulse of desired delay with respect to said edges, a generator producing pedestal pulses in response to said multivibrator pulses, a sweep generator for producing an electron beam sweep during the occurrence of a pedestal pulse, means operable in response to said alternately positive and negative wave for separating the sweeps occurring on the positive and negative cycles a desired amount, and means for receiving pulse emissions being connected to said tube, whereby the emission pulses will be displayed on their respective sweeps upon the proper adjustment of said delay multivibrators, means for equalizing the displayed amplitudes of said emission pulses, means for superimposing said electron beam sweeps, and means for adjusting said delay multivibrators to maintain the emission pulses of both series of pulse emissions visually superimposed.

18. Apparatus for measuring the time difference between two series of pulse emissions of the same repetition rate comprising, a cathode ray tube, means producing a pulse train whose repetition frequency is adjustable to twice that of said pulse emissions, a square wave generator producing an alternately positive and negative wave in response to said pulse train, two adjustable delay multivibrators responsive respectively to the positive and negative edge of said square wave and producing pulses of desired delay with respect to said edges, a generator producing a pedestal pulse in response to said multivibrator pulses and connected to said tube, means responsive to said pedestal pulses for producing an electron beam sweep on said tube during the occurrence of a pedestal pulse, a trace shifter operated by said square wave and adjustable to separate the sweeps corresponding to said positive and negative wave a desired amount, means for receiving said pulse emissions being connected to said tube, whereby said emission pulses will be displayed on the proper trace upon adjustment of the delay of said multivibrators, means for equalizing the displayed amplitudes of said emission pulses, means for superimposing said electron beam sweeps, and means for adjusting said delay multivibrators to maintain the emission pulses of both series of pulse emissions visually superimposed.

19. Apparatus for measuring the time difference between two series of pulse emissions of the same repetition rate comprising, means for receiving said emission pulses, a cathode ray tube, means producing a pulse train whose repetition frequency is adjustable to twice that of said pulse emissions, a square wave generator producing an alternately positive and negative wave in response to said pulse train, two adjustable delay multivibrators responsive respectively to the positive and negative edge of said square wave and producing pulses of desired delay with respect to said edges, means responsive to the output pulses of said multivibrators producing two electron beam sweeps on said tube, a trace shifter operated by said square wave and adjustable to separate the sweeps corresponding to said positive and negative wave a desired amount, means also operated by said square wave for adjusting the gain of said receiver means thereby to adjust said two series of pulse emissions to the same amplitude, and means coupling said receiving means to said tube whereby said emission pulses will be displayed on the proper sweep upon the proper adjustment of the delay of said multivibrators.

20. Apparatus for maintaining a recurrent series of first pulse emissions from a first transmitter in a known time relation with a similar second recurrent series of pulse emissions from a second transmitter comprising, a cathode ray tube, means producing a first and a second series of spaced electron beam sweeps on said tube in a predetermined time relation with the said time relation between said first and second pulse emissions, means actuating said second transmitter to cause it to emit a pulse substantially coincident with each of said second series of electron beam sweeps, means for receiving said first and second series of pulses and displaying them on said first and second series of electron beam sweeps, respectively, and means for adjusting said sweep producing means to maintain said first series of pulses visually superimposed upon said second series of pulses.

21. Apparatus for measuring the difference in time of arrival of two series of synchronized pulse emissions from a pair of remotely located transmitters comprising, means for receiving said pulses, a cathode ray tube, a timing wave generator, means responsive to said timing wave generator for producing a pulse train having a repetition frequency equal to twice the repetition frequency of said pulse emissions, a square wave generator responsive to said pulse train for producing a rectangular voltage wave having a frequency equal to the repetition frequency of said pulse emissions, two multivibrators responsive respectively to the positive and negative edge of said rectangular voltage wave for producing pulses delayed with respect to said edges, means for adjusting the duration of the pulses generated by one of said multivibrators, means responsive to the trailing edges of the pulses produced by said multivibrators for producing pedestal pulses, a slow sweep circuit responsive to said pulse train for producing electron beam traces on said cathode ray tube, a trace shifter operated by said rectangular voltage wave and adjustable to separate successive traces corresponding to the positive and negative portions of said traces, means to superimpose said fast sweep rectangular voltage wave, means for connecting said receiving means and said pedestal pulses to said cathode ray tube whereby each emission pulse is displayed on a pedestal pulse on its respective sweep, a fast sweep circuit responsive to said pedestal pulses to produce electron beam traces on said cathode ray tube during the occurrence of each pedestal pulse, means for substituting said fast sweep traces for said slow sweep traces, whereby said two series of pulse emissions means to superimpose said fast sweep traces, are displayed each on one of said fast sweeps and superimposed to display a single pulse upon adjustment of the duration of the pulse generated by said one multivibrator.

22. Apparatus in accordance with claim 21 and means operable in response to said rectangular voltage wave for controlling the gain of said receiving means to display said two series of pulse emissions with equal amplitude on said sweeps.

23. Apparatus in accordance with claim 22 and means responsive to said pulse train generating means for generating marker pulses, and means for displaying said marker pulses on said sweeps.

24. Apparatus for measuring the difference in time of arrival of two synchronized series of pulse emissions from a pair of remotely located transmitters comprising, a cathode ray tube, means for producing a pair of separated electron beam traces on said cathode ray tube, said electron beam traces being of equal duration and substantially equal to one-half the period between the pulses of said series of pulse emissions, means for receiving said series of pulses and displaying one each on one of said electron beam traces, means for generating a series of pedestal pulses and operative to display a pedestal pulse on each of said traces, means for adjusting the position of said pedestal pulses on said traces so that the pulses of said two series of emissions are displayed at the same position on its respective pedestal pulse, and means for generating and displaying marker pulses on said electron beam traces whereby the time difference of initiation of said pedestal pulses may be determined by counting marker pulses.

25. Apparatus for measuring the difference in time of arrival of two series of pulse emissions from a pair of remotely located transmitters comprising, a cathode ray tube, timing means for producing a train of pulses of a frequency equal to the repetition rate of said pulse emissions, a slow sweep generator responsive to said train of pulses for producing electron beam traces on said cathode ray tube, means for separating successive traces a controllable amount, said beam traces being of a duration substantially equal to one-half the period between pulses of said series of pulse emissions, means for receiving said series of pulses and displaying one each on one of said traces, means responsive to said train of pulses for generating a series of pedestal pulses and operative to display a pedestal pulse on each of said traces, means for adjusting the position of said pedestal pulses on said traces so that the pulses of said two series of emissions are displayed at substantially the same position on its respective pedestal pulse, a fast sweep generator responsive to each of said pedestal pulses for producing separated electron beam traces on said cathode ray tube of a duration substantially equal to the duration of said pedestal pulses, means for substituting said fast sweep generator for said slow sweep generator, means for superimposing said fast sweep traces on said cathode ray tube whereby said pulse emissions may be accurately aligned, and means for generating and displaying marker pulses on said slow and fast beam traces whereby the time difference of arrival between said series of pulse emissions may be determined by counting marker pulses.

26. Apparatus for measuring the time difference between two synchronized series of pulse emissions comprising, a cathode ray tube, means producing upon said cathode ray tube two separated electron beam traces, means for receiving said series of pulses and displaying one each on one of said electron beam traces, means for generating a series of pedestal pulses and operative to display a pedestal pulse on each of said traces, means for adjusting the position of said pulses on said traces so that the pulses of said two series of emissions are displayed at the same position on its respective pedestal pulse, and means for generating and displaying marker pulses on said electron beam traces whereby the time difference between said pedestal pulses may be determined by counting marker pulses.

References Cited in the file of this patent

UNITED STATES PATENTS

| Number | Name | Date |
|---|---|---|
| 2,403,429 | Anderson | July 9, 1946 |
| 2,403,600 | Holmes et al. | July 9, 1946 |
| 2,403,626 | Wolff et al. | July 9, 1946 |
| 2,405,238 | Seeley | Aug. 6, 1946 |
| 2,420,516 | Bischoff | May 13, 1947 |
| 2,430,570 | Hulst | Nov. 11, 1947 |
| 2,445,361 | Mountjoy et al. | July 20, 1948 |
| 2,512,923 | Dippy | June 27, 1950 |

FOREIGN PATENTS

| Number | Country | Date |
|---|---|---|
| 866,695 | France | May 31, 1941 |
| 581,602 | Great Britain | Oct. 18, 1946 |

OTHER REFERENCES

Serial No. 429,583, De France (A. P. C.), published June 15, 1943.

UNITED STATES PATENT OFFICE
CERTIFICATE OF CORRECTION

Patent No. 2,689,346

September 14, 1954

John A. Pierce et al.

It is hereby certified that error appears in the printed specification of the above numbered patent requiring correction and that the said Letters Patent should read as corrected below.

Column 22, line 60, strike out "traces, means to superimpose said fast sweep"; line 70, strike out "whereby said two series of pulse emissions" and insert the same after "traces," in line 71, same column.

Signed and sealed this 21st day of July 1959.

(SEAL)
Attest:

KARL H. AXLINE
Attesting Officer

ROBERT C. WATSON
Commissioner of Patents